US012548942B2

(12) United States Patent
Schmidt et al.

(10) Patent No.: US 12,548,942 B2
(45) Date of Patent: Feb. 10, 2026

(54) ELECTRICAL CONNECTOR FOR CONNECTING HIGH VOLTAGE POWER CABLE INCLUDING ELECTRICAL CONDUCTOR TO ELECTRICAL TERMINAL

(71) Applicant: Aptiv Technologies AG, Schaffhausen (CH)

(72) Inventors: Rainer Schmidt, Nuremberg (DE); Ricardo J. Gomez, Nuremberg (DE); Mirko Posmik, uml u+ee rth (DE)

(73) Assignee: Aptiv Technologies AG, Schaffhausen (CH)

( * ) Notice: Subject to any disclaimer, the term of this patent is extended or adjusted under 35 U.S.C. 154(b) by 296 days.

(21) Appl. No.: 18/211,432

(22) Filed: Jun. 19, 2023

(65) Prior Publication Data

US 2024/0022017 A1 Jan. 18, 2024

(30) Foreign Application Priority Data

Jul. 15, 2022 (EP) .................................... 22185208

(51) Int. Cl.
*H01R 43/00* (2006.01)
*H01R 13/52* (2006.01)

(52) U.S. Cl.
CPC ....... *H01R 13/5219* (2013.01); *H01R 43/005* (2013.01)

(58) Field of Classification Search
None
See application file for complete search history.

(56) References Cited

U.S. PATENT DOCUMENTS

| | | | | |
|---|---|---|---|---|
| 4,983,344 A * | 1/1991 | Brown | H01R 43/005 | 264/328.7 |
| 5,334,039 A | 8/1994 | Kanda | | |
| 5,447,446 A * | 9/1995 | Miller | H01R 13/5219 | 439/281 |
| 5,823,811 A * | 10/1998 | Blanchfield | H01R 13/5221 | 439/589 |
| 11,621,505 B2 * | 4/2023 | Attarzadeh | H01R 13/504 | 439/521 |
| 2021/0384651 A1 | 12/2021 | Attarzadeh et al. | | |

FOREIGN PATENT DOCUMENTS

| | | |
|---|---|---|
| CN | 215600703 U | 1/2022 |
| DE | 102005014373 B3 | 8/2006 |
| WO | 8904072 A1 | 5/1989 |

OTHER PUBLICATIONS

Extended European Search Report for Application No. 22185208.0; dated Jan. 4, 2023; 9 pages.

* cited by examiner

*Primary Examiner* — Tho D Ta
(74) *Attorney, Agent, or Firm* — Billion & Armitage

(57) ABSTRACT

The present disclosure relates to a connector housing for an electrical connector. The connector housing includes a housing body having a first opening and a second opening. The connector housing also includes a first seal and a second seal. The connector housing further includes a connection element connecting the first seal and the second seal. The first seal is molded to inner walls of the first opening and the second seal is molded to inner walls of the second opening. The first seal, the second seal, and the connection element are integrally formed.

18 Claims, 7 Drawing Sheets

(state of the art)

ELECTRICAL CONNECTOR FOR CONNECTING HIGH VOLTAGE POWER CABLE INCLUDING ELECTRICAL CONDUCTOR TO ELECTRICAL TERMINAL

CROSS-REFERENCE TO RELATED APPLICATION

This application claims benefit of priority to European Patent Application No. 22185208.0 filed on Jul. 15, 2022, the entire disclosure of which is hereby incorporated by reference.

TECHNICAL FIELD OF THE INVENTION

The present disclosure relates to a connector housing for an electrical connector, an electrical connector, a modular connector assembly, and a method for manufacturing a connector housing.

BACKGROUND

Electrical connectors that include a terminal and/or another electrical conductor must regularly be sealed against dust, moisture, liquid and/or dirt. Otherwise, short circuits and/or other impairments can be the result. A wide range of requirements are placed on respective seals for electrical connectors, which may vary depending on the area of application. However, several generally applicable requirements regularly exist for seals, as set out below, whereby it is understood that this listing is not exhaustive.

Firstly, it is usually necessary to implement a seal that can withstand certain loads, such as vibrations, without the sealing effect being impaired. Particularly, it is necessary for the seal to remain in position when subjected to loads.

Secondly, requirements are regularly set for seals regarding the necessary installation space. Especially if the available installation space is limited, e.g., in a vehicle, the installation space required for sealing is usually also limited.

Thirdly, seals must meet certain requirements regarding assembly. On the one hand, it must be ensured that the seal is not damaged during assembly. On the other hand, assembly must not be so complex that it causes difficulties for the worker.

Existing seals for electrical connectors, however, have various disadvantages and/or do not or only partially meet the requirements mentioned above. This is set out below for a modular connector assembly from the automotive sector that is schematically depicted in FIG. 14.

The modular connector assembly 3000 of FIG. 14 includes an electrical connector 1000 and a carrier housing 3500 in which the electrical connector 1000 is arranged. The electrical connector 1000 includes a terminal 1100, a housing body 110 having a first opening for receiving a counter connector 4100 of a modular counter connector assembly 4000, and a second opening in which a terminal position assurance element (TPA) 170 is arranged. Seals are provided such that a space between the carrier housing 3500 and the electrical connector 1000 is sealed when the modular counter connector assembly 4000 is inserted to avoid dust, moisture, liquid and/or dirt reaching the inside of the electrical connector 1000 through the first opening and the second opening. As depicted, a first seal 3001 is arranged between the carrier housing 3500 and the electrical connector 1000, i.e., the housing body 110. A second seal 4002 is arranged in the modular counter connector assembly 4000 between the counter connector 4100 and a respective counter carrier housing 4500. A third seal 4003 is arranged on a seal holder of the counter carrier housing 4500 to seal the counter carrier housing 4500 and the carrier housing 3500, when mated. The modular connector assembly 3000, the respective modular counter connector assembly 4000, and particularly the configuration of the seals have several disadvantages listed below.

The seals regularly fail to withstand the occurring loads, such as vibrations and/or shock loads. This is as the seals are manually arranged and tend to be displaced, at least if no additional seal retention elements are provided.

It has been shown in practice that the required installation space is often too large for many applications, thus complicating or even limiting the application of the connector assembly 3000 and the respective modular counter connector assembly 4000.

The modular connector assembly 3000 and the respective modular counter connector assembly 4000 are disadvantageous regarding the assembly of the seals due to the manual assembly the seals tending to get damaged and/or contaminated during assembly and the assembly being complex, such that a slow and/or incorrect assembly may take place.

Additionally, the modular connector assembly 3000 and the respective modular counter connector assembly 4000 require a high assembly effort die to three seals in addition to mat seals that are installed within the two different components.

Furthermore, the carrier housing 3500 must be sealed before inserting the electrical connector 1000 so that no dust, moisture, liquid and/or dirt penetrates that could later enter the connector 1000 after insertion. The connector 1000 must also be undamaged as well as free of dust, moisture, liquid and/or dirt, before being inserted in carrier 3500, which is difficult and/or complex when the radial seal is exposed, as it is with seal 3001 in connector 1000.

SUMMARY

It is an object of the present disclosure to provide a connector housing for an electrical connector, an electrical connector, a modular connector assembly, and a method for manufacturing a connector housing that overcome the aforementioned drawbacks at least partially.

This object is achieved, at least partly, by a connector housing for an electrical connector, an electrical connector, a modular connector assembly, and a method for manufacturing a connector housing according to the present disclosure.

Particularly, the object is achieved by a connector housing for an electrical connector. The connector housing includes a housing body having a first opening and a second opening. The housing body may be formed from bent sheet metal and/or a plastic material, particularly a reinforced plastic. Moreover, the housing body may be manufactured by injection molding or casting. It should be understood that the housing body may include a plurality of parts.

The connector housing includes a first seal and a second seal. The connector housing includes a connection element connecting the first seal and the second seal. The first seal is molded to inner walls of the first opening and the second seal is molded to inner walls of the second opening, wherein the first seal, the second seal, and the connection element are integrally formed.

The first seal and/or the second seal may serve to achieve a seal together with an element inserted into the respective opening. The first seal and/or the second seal may serve to seal the inside of the connector housing against dust, moisture, liquid and/or dirt, thereby protecting a terminal and/or another electrical conductor inside the connector housing. The connector housing may include more than two seals and accordingly more than one connection element. The term “inner walls” may refer to one or more surfaces associated with the respective opening. For example, if the first opening is a cylindrical recess, the inner walls may be the lateral surface of the cylindrical recess. The term “integrally formed” may refer to the aspect that no material boundary may be identified between the first seal, the second seal, and the connection element. Furthermore, “integrally formed” may refer to the aspect that the first seal, the second seal, and the connection element are formed as one connected element.

By the above configuration of the connector housing several advantages are achieved, as set out in the following.

Firstly, since the seals withstand higher loads, due to a better adhesion because they are molded to the inner walls. Additionally, the seal may act as a damper and allow the system to perform better against higher vibration loads.

Secondly, since the first seal and the second seal are molded to the inner walls and not to the outside of the housing body, the required installation space is reduced. This is particularly beneficial for confined installation spaces.

Thirdly, the above-described disadvantages regarding assembly are at least partially overcome. Since the seals are not manually assembled, they are less prone to get damaged and/or contaminated during assembly. As the seals are molded to the inner walls, they are protected during further assembly of the connector housing. Since the first seal, the second seal, and the connection element are integrally formed, i.e., are molded as one element, the assembly effort is reduced compared to embodiments where several separate seals are manually arranged.

If the connector housing is to be arranged in a carrier housing, e.g., in a modular configuration, then additional advantages are at hand. Particularly, the carrier housing does not need to be sealed before inserting the electrical connector. This is as no dust, moisture, liquid and/or dirt that penetrated inside the carrier housing could later enter the connector housing after assembly, as the connector housing is sealed itself. Further, since the seals are provided in the housing body no seals and/or seal holders are required for sealing a space between the connector housing and a potential carrier housing.

The first seal, the second seal, and the connection element may be injection molded. The adhesion of the seals to the housing body may be increased by injection molding the first seal, the second seal, and the connection element, such that they may stably remain in position when subjected to external loads. Optionally, the first seal, the second seal, and the connection element are injection molded with a single injection into the housing body. More optionally the first seal, the second seal, and the connection element are injection molded through a single injection point into the housing body. Hence, the material structure of the first seal, the second seal, and the connection element may be homogeneous, i.e., without weld lines. The first seal, the second seal, and the connection element may be provided efficiently, i.e., with few steps and/or in less time.

The connection element may have an elongated shape which optionally extends along an inside of the housing body. By the elongated shape, the connection element requires less material. By extending along the inside of the housing body it can be avoided that the connection element is a disturbing element on the outside of the housing body. More optionally the connection element has a substantially circular cross-section. Substantially circular cross-sections have been proven to allow for a fast and homogeneous flow during molding and particularly injection molding such that seals of high quality can be quickly manufactured. The term “substantially” according to the present application may refer to the aspect that not the geometrically strict form is required, but e.g., tolerance-related deviations are also possible. Moreover, the connection element may have an elongated shape which optionally extends along an outside of the housing body. The outside channel may be an exposed channel.

The housing body may include a channel through which the connection element extends, wherein the channel optionally extends from the first opening to the second opening. The channel may serve as an overflow channel for injection molding. Hence, when a polymer is injection molded into one of the first opening and the second opening, the polymer may flow through the channel into the respective other opening. A fast manufacturing of the connector housing can thereby be achieved. Further, the complexity of the tools required for injection molding the first seal, the second seal, and the connection element may be reduced by extending the channel from the first opening to the second opening.

The first seal and/or the second seal may be circumferential seals. It is understood that the first seal and/or the second seal may have closed contour. Hence, a circumferential sealing may be achieved for the first opening and/or the second opening.

The first seal and/or the second seal may be flush with an outside surface of the housing body. This allows a sealing to be achieved with an element inserted into the first and/or second opening and with an element abutting the outside of the housing body. Thus, the functionality of the first and/or the second seal can be increased. It goes without saying that the term “flush” is not to be interpreted in a geometrically strict sense. Rather common tolerances regarding flushness may be taken into account.

At least one of the first opening and the second opening may be configured to receive a counter connector. Hence, the first seal and/or the second seal may serve to achieve a sealing together with the counter connector, thereby protecting the inside of the connector housing against dust, moisture, liquid and/or dirt, at least when the counter connector is inserted. Accordingly, a terminal and/or another electrical conductor inside the connector housing may be protected. Since the sealing of a mating area may be achieved together with the counter connector, no seals must be provided at the counter connector. This allows simpler connection systems to be achieved and/or a reduction of parts, such as seals. It is understood that the at least one of the first opening and the second opening may be configured to receive a component intended to secure electrical components, such as terminal, being mounted in the connector housing.

The first opening and the second opening may each be configured to receive a counter connector, wherein a central axis of the first opening is substantially parallel to a central axis of the second opening. Hence, the connector housing may allow for a first counter connector to be electrically connected to a second counter connector inside the connector body. Thus, a connection of the first counter connector to the second counter connector may be sealed against dust, moisture, liquid and/or dirt. Particularly, a mating area of both counter connectors may be sealed by the first seal and the second seal respectively. Hence, no further seals may be required to seal the connection between the counter connectors. By the central axis of the first opening being substantially parallel to the central axis of the second opening the first counter connector may be connected to the second counter connector by an electrical contact pin which may be straight. Hence, the connector housing may serve as a linearly pluggable shunt housing.

The first opening may be configured to receive a counter connector and the second opening may be configured to receive a terminal position assurance element. Hence, the terminal position assurance (TPA) element does not need to be provided with a seal, which may contribute to a reduction of assembly steps. Further, no sealing must be provided which would ensure that the outside of the connector housing, in which the TPA element is inserted, is sealed against dust, moisture, liquid and/or dirt. Thus, complexity, installation space and/or assembly steps may be reduced. Moreover, when the counter connector is inserted into the first opening, it is also sealed so that no further seal is necessary to seal a mating area of the counter connector.

Optionally a central axis of the first opening is substantially perpendicular to a central axis of the second opening. Hence, the terminal position assurance element can perpendicularly engage with a terminal. More optionally the housing body has a third opening which is configured to receive a terminal. It is understood that this third opening may be exemplarily sealed by means of a mat seal. Further, alternatively, the second opening may be configured to receive a primary lock reinforcer.

The first seal, the second seal, and the connection element are optionally made from a liquid silicone rubber (LSR). Liquid silicone rubbers have proven to be advantageous for integrally forming the first seal, the second seal, and the connection element due to the relatively low viscosity. An exemplary liquid silicone rubber includes the following components: Linear siloxanes, fillers, and additives. Particularly preferred liquid silicone rubbers are standard types, fluorosilicone types, oil-bleeding silicones, fast-curing types, and/or adhesion modified types. Nevertheless, it is understood that any other polymer may be used for the first seal and/or the second seal.

Further, the object is achieved by an electrical connector including a connector housing as specified above, and an electrical conductor being arranged at least partially inside the connector housing. The electrical conductor may include at least one of the following: an electrical contact pin, a terminal, a cable, a wire, or another electrically conductive element. The electrical connector may be inserted into the housing body. Further, the electrical conductor may be fixedly attached to the housing body, e.g., by overmolding. Since the electrical connector includes a connector housing as specified above, it is understood that the respective advantages apply accordingly.

The electrical connector may include a connector housing, wherein the first opening and the second opening are each configured to receive a counter connector, wherein a central axis of the first opening is substantially parallel to a central axis of the second opening. Hence, the connector housing may serve as a linear pluggable shunt housing. The electrical conductor may include at least one electrical contact pin extending from the first opening into second opening. Thus, the at least one electrical contact pin may establish an electrical connection between a first counter connector inserted into the first opening and a second counter connector inserted into the second opening. The mating area of both counter connectors may be sealed by the first seal and the second seal respectively. Hence, no further seals may be required to seal the mating area of both counter connectors.

Further, the electrical connector may include a connector housing, wherein the first opening is configured to receive a counter connector and the second opening is configured to receive a terminal position assurance element, wherein optionally a central axis of the first opening is substantially perpendicular to a central axis of the second opening, wherein more optionally the housing body has a third opening which is configured to receive a terminal. The electrical conductor may be a terminal being at least partially received inside the third opening, and wherein a terminal position assurance element engaging with the terminal may be arranged in the second opening. It is understood that when the counter connector and the terminal position assurance element are inserted only the third opening may need further sealing, e.g., by a mat seal. Hence, the complexity of assembly and/or number of required seals is reduced, particularly when compared to the state of the art as described in the introduction.

Moreover, the object is achieved by a modular connector assembly including at least one electrical connector as described above, and a carrier housing in which the at least one electrical connector is arranged. The carrier housing may include a bent sheet metal and/or a plastic, particularly a reinforced plastic. Moreover, the carrier housing may be manufactured by injection molding or casting. Further, it is understood that the carrier housing may include a plurality of parts. The modular connector assembly has the advantage that the carrier housing does not need to be sealed before inserting the electrical connector. This is as no dust, moisture, liquid and/or dirt that penetrated inside the carrier housing could later enter the connector housing after assembly, as the connector housing is sealed itself. Further, since the seals are provided in the housing body no seals and/or seal holders are required for sealing a space between the connector housing and the carrier housing. This allows the carrier housing to be designed more simply, i.e., without seal holders and/or seal retention elements. Moreover, the required installation space may be reduced. The at least one electrical connector may be arranged and/or fixed by a mechanical element either integrated in the carrier housing and/or by an external component such as a fixing screw or a clip. Further, the carrier housing may include a mechanical element, directly molded or externally mounted, that provides a mechanical fastening with a counterpart.

Furthermore, the object is achieved by a method for manufacturing a connector housing for an electrical connector, optionally the connector housing as specified above. Since the method relates to a connector housing, it is understood that the features and respective advantages described above regarding the connector housing also apply for the method described herein.

The method includes the following steps: (a) injection molding a housing body with a first opening and a second opening, and thereafter (b) injection molding a first seal, a second seal, and a connection element with a single injection into the housing body. The connection element connects the first seal and the second seal, wherein the first seal is injection molded to inner walls of the first opening and the second seal is injection molded to inner walls of the second opening, wherein the first seal, the second seal, and the connection element are integrally formed.

The two-step injection molding process allows the manufacturing time of the connector housing to be significantly reduced. In addition, the connection element of the seals allows for a reduction of required injection points. Optionally the first seal, the second seal, and the connection element are injection molded through a single injection point into the housing body. Hence, the material structure of the first seal, the second seal, and the connection element may be homogeneous, i.e., without weld lines. The term of a “single injection” may be also referred to as a “single injection shot”.

BRIEF DESCRIPTION OF THE DRAWINGS

The present invention is now described, by way of example with reference to the accompanying drawings, in which.

DETAILED DESCRIPTION

Figure 1:
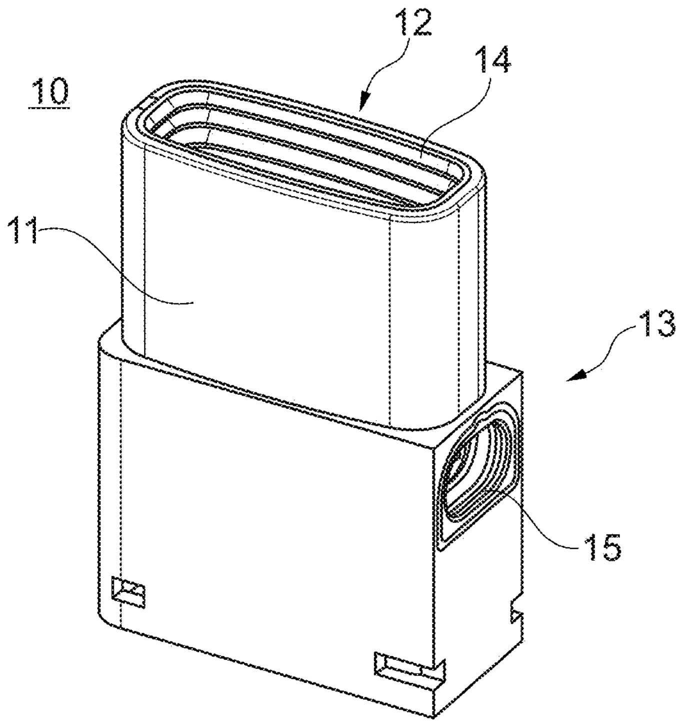
FIG. 1 is a perspective view of a connector housing according to some embodiments.

FIGS. 1, 2, 3, 5, and 6 depict a connector housing 10 according to a first embodiment of the present disclosure. The connector housing 10 is for an electrical connector 100, as depicted in FIGS. 9, 10, 11, and 13. As shown, the connector housing 10 includes a housing body 11 having a first opening 12 and a second opening 13.

Figure 3:
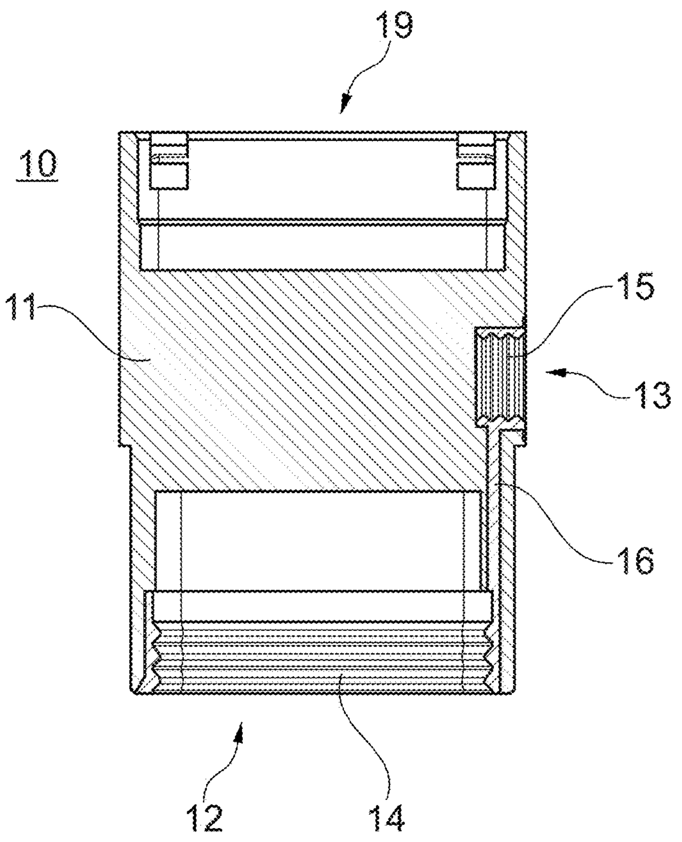
FIG. 3 is a cross-section view of the connector housing according to some embodiments.

Further, as can be particularly seen in FIG. 3, the connector housing 10 includes a first seal 14 and a second seal 15, and a connection element 16 connecting the first seal 14 and the second seal 15. The first seal 14 is molded to inner walls of the first opening 12 and the second seal 15 is molded to inner walls of the second opening 13.

Figure 4:
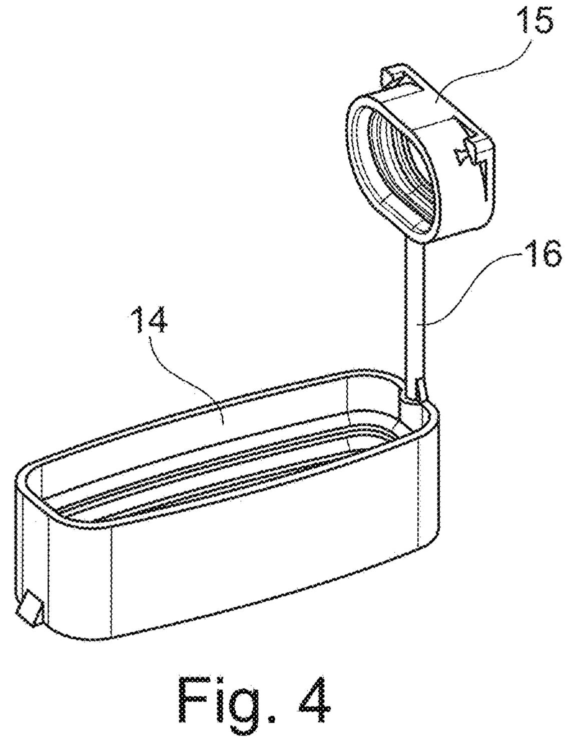
FIG. 4 is a perspective view of the integrally formed first seal, second seal, and connection element according to some embodiments.

FIG. 4 depicts the first seal 14 and the second seal 15, being connected by the connection element 16. The first seal 14, the second seal 15, and the connection element 16 are integrally formed.

Figure 5:
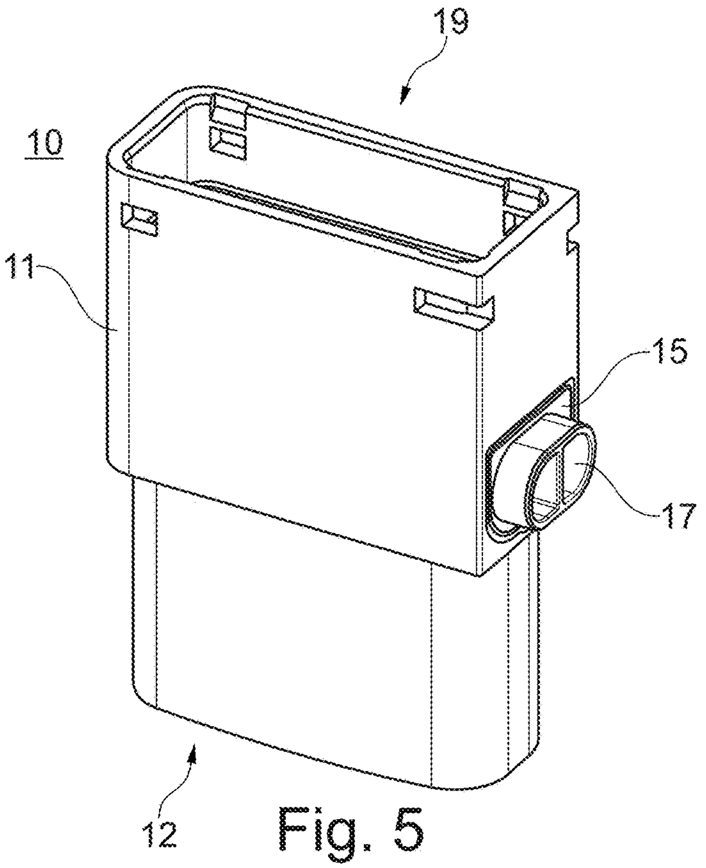
FIG. 5 is a perspective view of the connector housing with a terminal position assurance (TPA) element according to some embodiments.
Figure 6:
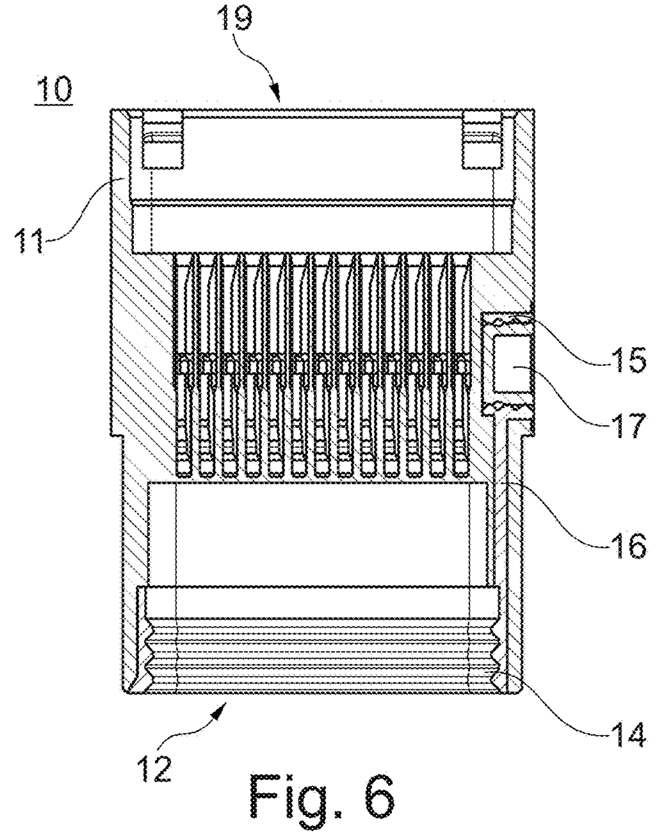
FIG. 6 is a cross-section view of the connector housing with the terminal position assurance element according to some embodiments.

As it is understood from FIGS. 1, 2, 3, 5, and 6 together with FIGS. 9, 10, 11, and 13, the first opening 12 is configured to receive a counter connector. Moreover, as depicted in FIG. 5 and FIG. 6 a terminal position assurance (TPA) element 17 is arranged in the second opening 13, and the housing body 11 has a third opening 19 which is configured to receive a terminal. A central axis of the first opening 12 is perpendicular to a central axis of the second opening 13. Hence, the terminal position assurance element 17 can perpendicularly engage with a terminal, as e.g., depicted in FIG. 13.

Figure 7:
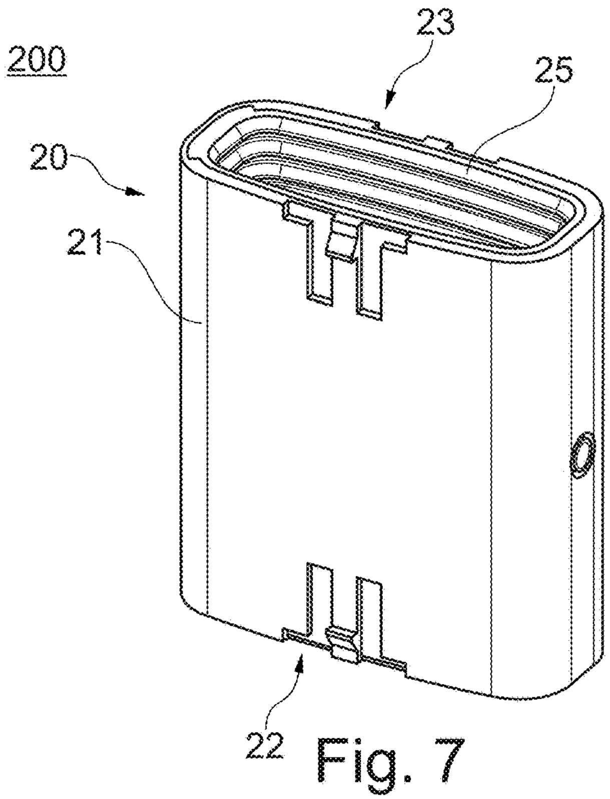
FIG. 7 is a perspective view of an electrical connector including a connector housing according to some embodiments.
Figure 8:
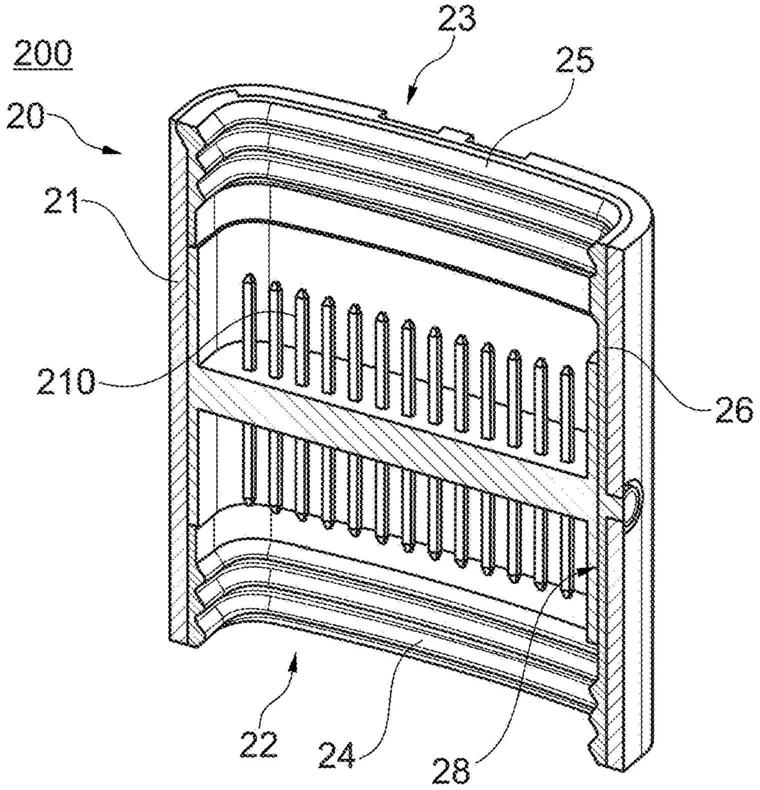
FIG. 8 is a perspective cross-section view of the electrical connector including the connector housing according to some embodiments.
Figure 9:
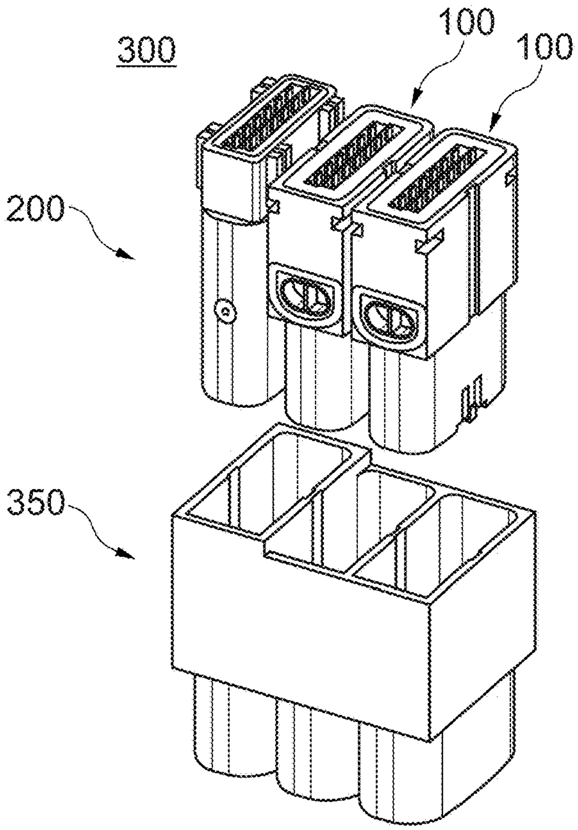
FIG. 9 is a perspective and partially exploded view of a modular connector assembly according to some embodiments.

Further, FIGS. 7 and 8 depict an electrical connector 200 with a connector housing according to a second embodiment of the present disclosure. The connector housing 20 includes a housing body 21 having a first opening 22 and a second opening 23. Moreover, the connector housing 20 includes a first seal 24, a second seal 25, and a connection element 26 connecting the first seal 24 and the second seal 25. The first seal 24 is molded to inner walls of the first opening 22 and the second seal 25 is molded to inner walls of the second opening 23, wherein the first seal 24, the second seal 25, and the connection element 26 are integrally formed.

Figure 10:
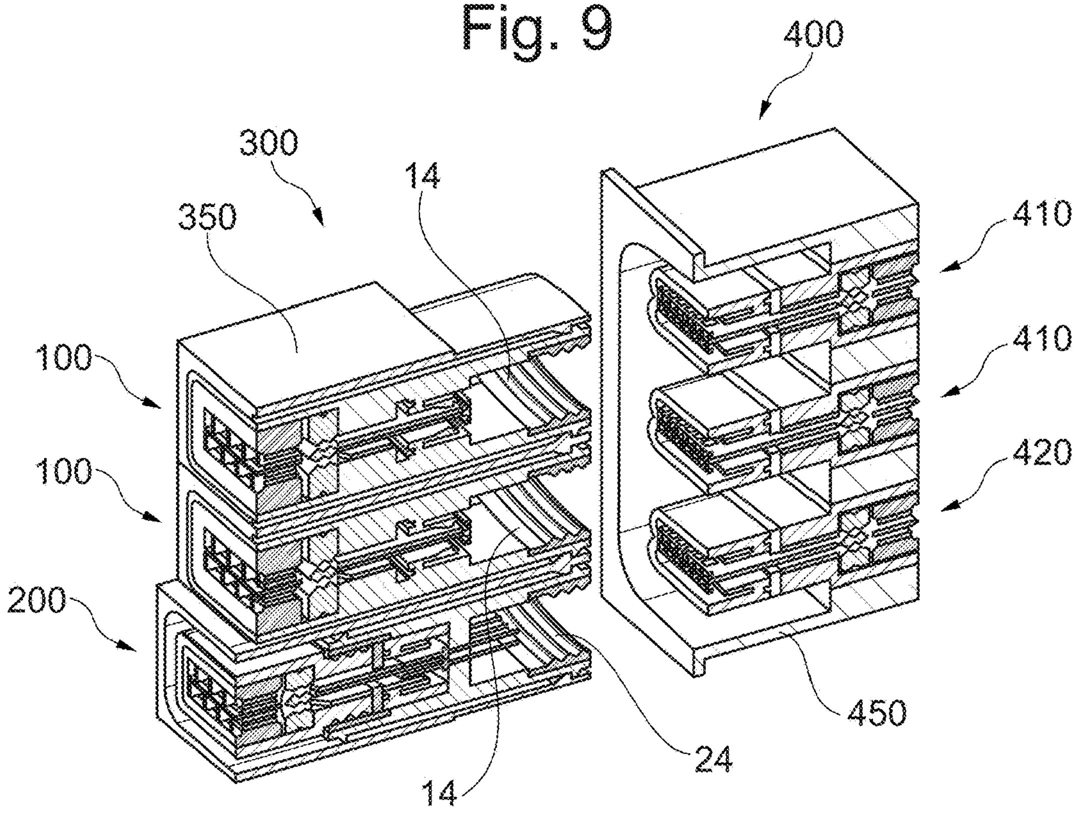
FIG. 10 is a perspective cross-section view of the modular connector assembly and a respective modular counter connector assembly according to some embodiments.
Figure 11:
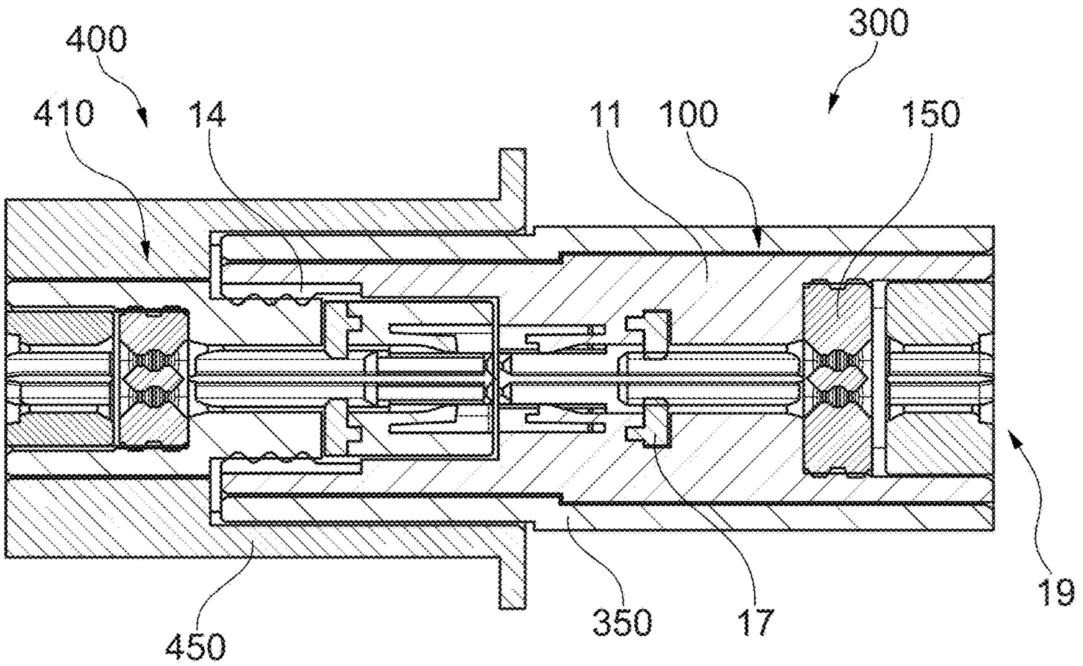
FIG. 11 is a cross-section view of the modular connector assembly mated with the modular counter connector assembly according to some embodiments.
Figure 12:
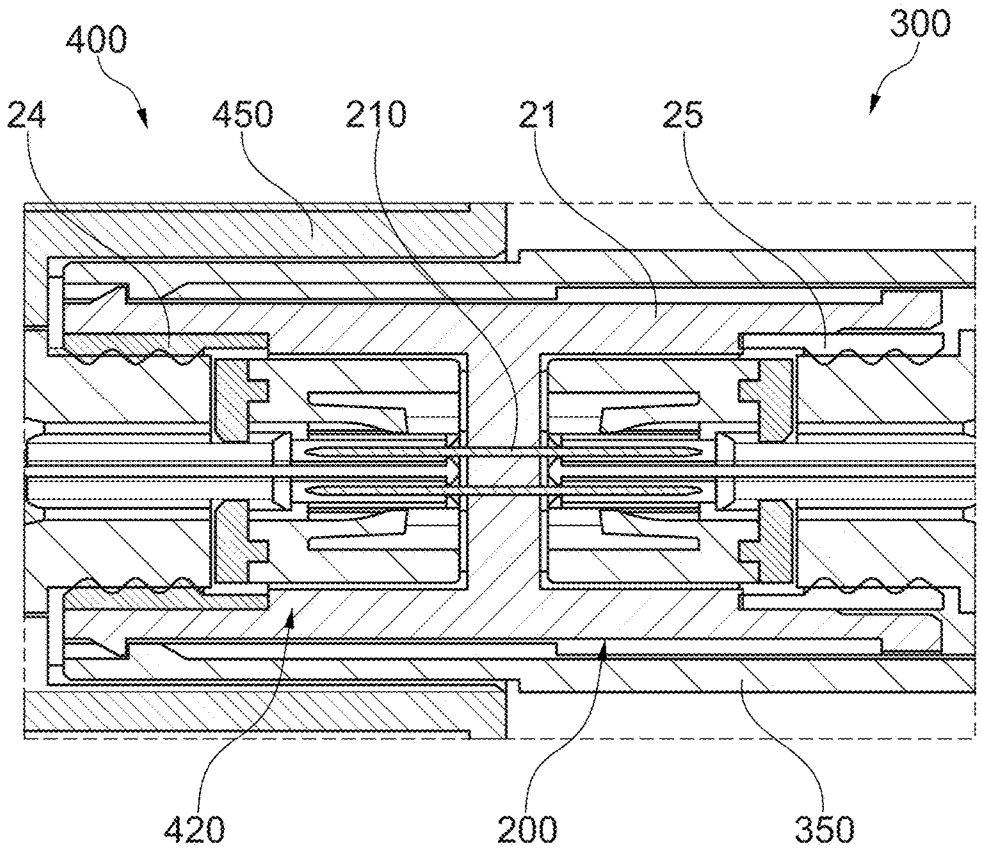
FIG. 12 is a cross-section view of the modular connector assembly mated with the modular counter connector assembly according to some embodiments.

As it is understood from FIGS. 7 and 8 together with FIGS. 10 and 12, the first opening 22 and the second opening 23 are each configured to receive a counter connector, wherein a central axis of the first opening 22 is parallel to a central axis of the second opening 23.

In the connector housings 10; 20 according to the first and the second embodiment of the present disclosure, the first seal 14, 24, the second seal 15, 25, and the connection element 16, 26 are injection molded.

Moreover, as shown in FIGS. 3, 4, 6, and 8, the connection elements 16, 26 of the first and the second embodiment have an elongated shape which extends along an inside of the housing body 11, 21. As in FIG. 4, the connection element 16 has a substantially circular cross-section.

Figure 2:
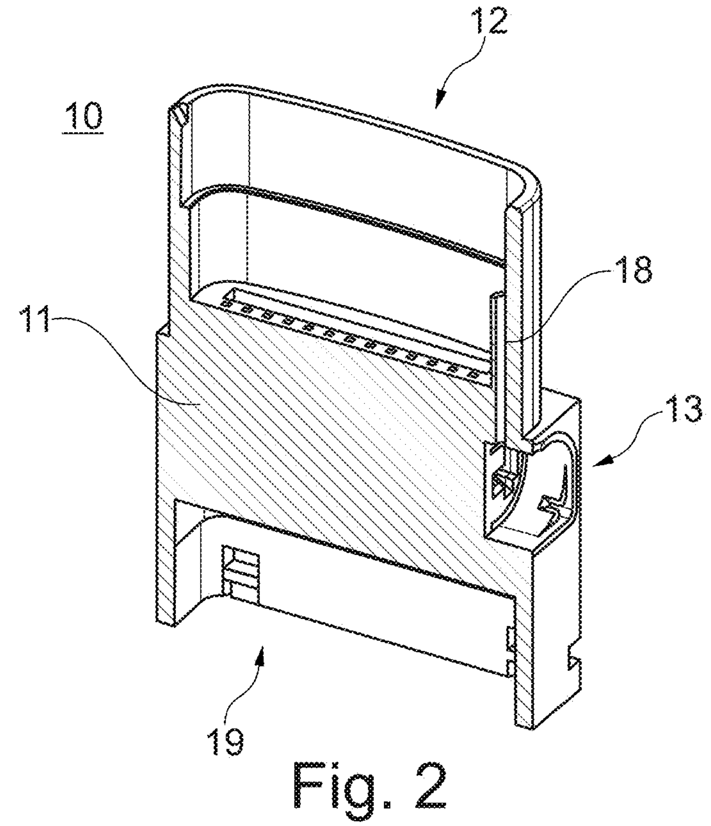
FIG. 2 is a perspective cross-section view of the connector housing, wherein the seals are hidden according to some embodiments.

Furthermore, as depicted in FIG. 2 (seals and connection element hidden) and FIG. 8 the housing bodies 11, 21 of the first and the second embodiment each include a channel 18, 28 through which the connection element 16, 26 extends. The respective channels 18, 28 extend from the first opening 12, 22 to the second opening 13, 23.

As illustrated by FIGS. 1 and 8, in the first and the second embodiment the first seal 14, 24 and the second seal 15, 25 are circumferential seals, wherein the first seal 14, 24 and the second seal 15, 25 are flush with an outside surface of the housing body 11, 21.

As mentioned above, FIGS. 7 and 8 depict an electrical connector 200. As can be further seen in FIG. 8, the electrical connector 200 includes an electrical conductor 210 being arranged inside the connector housing 20 which was previously described. The electrical conductor 210 includes several electrical contact pins extending from the first opening 22 into second opening 23. Particularly, the electrical connector 200 is a shunt module.

Figure 13:
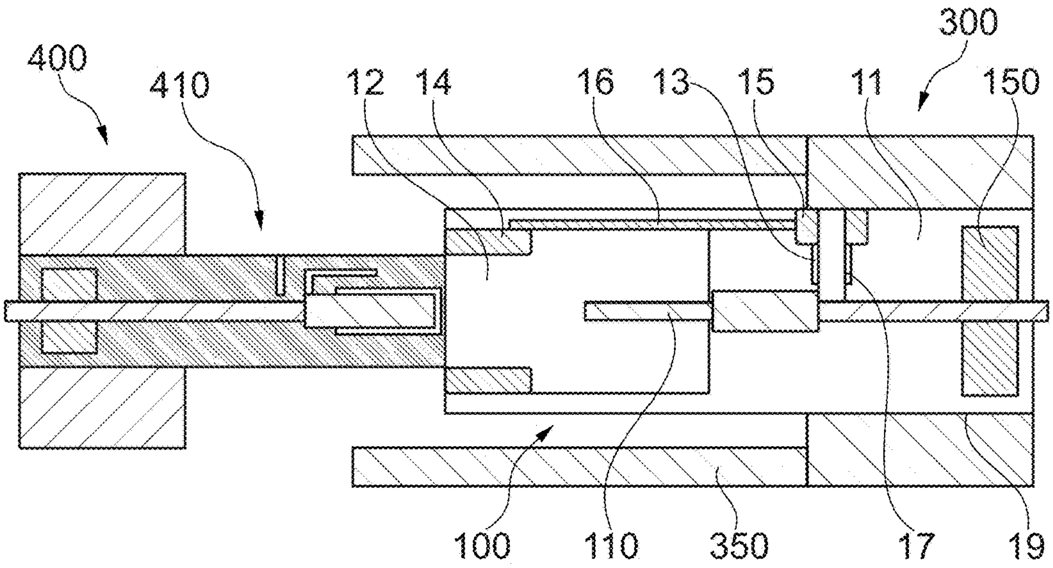
FIG. 13 is a schematic cross-section view of the modular connector assembly and the modular counter connector assembly according to some embodiments.
Figure 14:
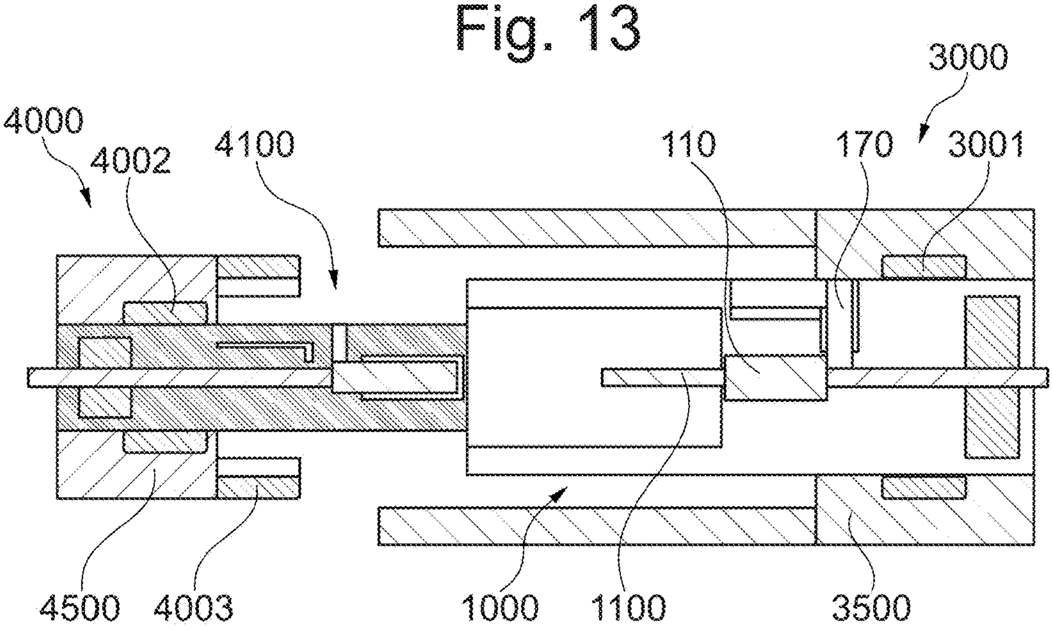
FIG. 14 is a schematic cross-section view of a modular connector assembly and a respective modular counter connector assembly according to the prior art.

Further, in FIGS. 9, 10, 11, and 13 an electrical connector 100 including the connector housing 10, as described above, is depicted. The electrical connector 100 includes an electrical conductor 110 being arranged inside the connector housing 10. It is understood that only in FIG. 13 the electrical conductor is shown, whereas in the other FIGS. 9 to 11 it is hidden for the sake of simplicity. As schematically illustrated in FIG. 13, the electrical conductor 110 is a terminal being received inside the third opening 19. A terminal position assurance element 17 engaging with the terminal is arranged in the second opening 13.

It is understood that when the counter connector 410 is inserted into the first opening 12 (see FIG. 11) and the terminal position assurance element 17 is inserted into the second opening 13 (see FIGS. 11 and 13) the inside of the electrical connector 100 is fully sealed. Particularly as the third opening 19 is sealed by a mat seal 150 (see FIGS. 11 and 13).

FIGS. 9 to 13 depict a modular connector assembly 300. As in FIGS. 9 and 10, the modular connector assembly 300 includes two electrical connectors 100 and one electrical connector 200. Moreover, the modular connector assembly 300 includes a carrier housing 350 in which the electrical connectors 100, 200 are arranged. Further, FIGS. 10 to 13 also show a respective modular counter connector assembly 400 with counter connectors 410, 420 and a counter carrier housing 450.

Figure 15:
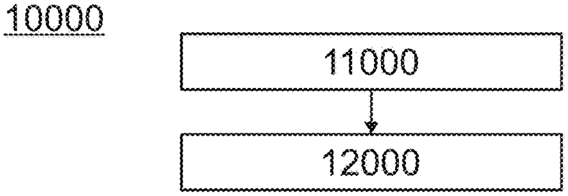
FIG. 15 is a flowchart illustrating a method for manufacturing a connector housing according to some embodiments.

FIG. 15 is a flowchart illustrating a method 10000 for manufacturing the connector housing 10, 20 for the electrical connector 100, 200 described above. The method includes the step of injection molding 11000 a housing body 11, 21 with a first opening 12, 22 and a second opening 13, 23. Further, the method 10000 includes the subsequent step of injection molding 12000 a first seal 14, 24, a second seal 15, 25, and a connection element 16, 26 with a single injection into the housing body 11, 21. The connection element 16, 26 connects the first seal 14, 24 and the second seal 15, 25. The first seal 14, 24 is injection molded to inner walls of the first opening 12, 22 and the second seal 15, 25 is injection molded to inner walls of the second opening 13, 23, wherein the first seal 14, 24, the second seal 15, 25, and the connection element 16, 26 are integrally formed.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes", "including", "includes", and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A connector housing for an electrical connector, wherein the connector housing comprises:
- a housing body having a first opening and a second opening;
- a first seal and a second seal, and
- a connection element connecting the first seal and the second seal, wherein the first seal is molded to inner walls of the first opening and the second seal is molded to inner walls of the second opening, wherein the first seal, the second seal, and the connection element are integrally formed, wherein the first opening is configured to receive a counter connector and the second opening is configured to receive a terminal position assurance, TPA, element, and wherein a central axis of the first opening is substantially perpendicular to a central axis of the second opening.

2. The connector housing according to claim 1, wherein the first seal, the second seal, and the connection element are injection molded.

3. The connector housing according to claim 1, wherein the first seal is a circumferential seal.

4. The connector housing according to claim 1, wherein the second seal is a circumferential seal.

5. The connector housing according to claim 1, wherein the first seal is flush with an outside surface of the housing body.

6. The connector housing according to claim 1, wherein the second seal is flush with an outside surface of the housing body.

7. The connector housing according to claim 1, wherein the first seal, the second seal, and the connection element are made from a liquid silicone rubber.

8. The connector housing according to claim 1, wherein the first opening and the second opening are each configured to receive a counter connector and wherein a central axis of the first opening is substantially parallel to a central axis of the second opening.

9. The connector housing according to claim 1, wherein the housing body has a third opening which is configured to receive a terminal.

10. The connector housing according to claim 1, wherein the connection element has an elongated shape which optionally extends along an inside of the housing body.

11. The connector housing according to claim 10, wherein the connection element has a substantially circular cross-section.

12. The connector housing according to claim 1, wherein the housing body comprises a channel through which the connection element extends.

13. The connector housing according to claim 12, wherein the channel optionally extends from the first opening to the second opening.

14. An electrical connector comprising:

a connector housing according to claim 1, and an electrical conductor being arranged at least partially inside the connector housing.

15. The electrical connector according to claim 14, wherein the electrical conductor comprises at least one electrical contact pin extending from the first opening into second opening.

16. The electrical connector according to claim 14, wherein the housing body has a third opening which is configured to receive a terminal and wherein the electrical conductor is a terminal being at least partially received inside the third opening and wherein a terminal position assurance, TPA, element engaging with the terminal is arranged in the second opening.

17. A modular connector assembly comprising:

at least one electrical connector according to claim 14, and a carrier housing in which the at least one electrical connector is arranged.

18. A method for manufacturing a connector housing for an electrical connector having a housing body having a first opening and a second opening, a first seal and a second seal, and a connection element connecting the first seal and the second seal, wherein the first opening is configured to receive a counter connector and the second opening is configured to receive a terminal position assurance, TPA, element, wherein a central axis of the first opening is substantially perpendicular to a central axis of the second opening, wherein the first seal is molded to inner walls of the first opening and the second seal is molded to inner walls of the second opening and wherein the first seal, the second seal, and the connection element are integrally formed, the method comprising:

injection molding the housing body defining the first opening and the second opening, and thereafter; and injection molding the first seal, the second seal, and the connection element with a single injection into the housing body, wherein the connection element connects the first seal and the second seal, wherein the first seal is injection molded to inner walls of the first opening and the second seal is injection molded to inner walls of the second opening, and wherein the first seal, the second seal, and the connection element are integrally formed.

* * * * *